United States Patent
Harper et al.

(10) Patent No.: US 8,531,469 B2
(45) Date of Patent: Sep. 10, 2013

(54) MEDIA SYNCHRONIZATION VIA IMAGE QUEUE

(75) Inventors: John Harper, San Francisco, CA (US); John Samuel Bushell, San Jose, CA (US)

(73) Assignee: Apple Inc., Cupertino, CA (US)

( * ) Notice: Subject to any disclaimer, the term of this patent is extended or adjusted under 35 U.S.C. 154(b) by 753 days.

(21) Appl. No.: 12/146,318

(22) Filed: Jun. 25, 2008

(65) Prior Publication Data

US 2009/0002381 A1 Jan. 1, 2009

Related U.S. Application Data

(60) Provisional application No. 60/937,876, filed on Jun. 28, 2007.

(51) Int. Cl.
*G06T 1/00* (2006.01)

(52) U.S. Cl.
USPC .......................................................... 345/522

(58) Field of Classification Search
USPC ..................... 345/522; 709/219; 715/700
See application file for complete search history.

(56) References Cited

U.S. PATENT DOCUMENTS

| 5,142,615 A * | 8/1992 | Levesque et al. | 345/595 |
| 2005/0237330 A1* | 10/2005 | Stauffer et al. | 345/531 |
| 2007/0162571 A1* | 7/2007 | Gupta et al. | 709/219 |
| 2008/0034292 A1* | 2/2008 | Brunner et al. | 715/700 |

* cited by examiner

*Primary Examiner* — Ke Xiao
*Assistant Examiner* — Kyle Zhai
(74) *Attorney, Agent, or Firm* — Wong, Cabello, Lutsch, Rutherford & Brucculeri, LLP

(57) ABSTRACT

This invention is directed to a system for processing media in an electronic device. An application operative to request the display of one or more graphics elements may be implemented on the electronic device. The application may identify graphics elements for display and organize the graphics elements in a layer tree for processing and display by a render server (e.g., a core animation render server). To coordinate the processing of graphics elements of the application or of several applications, the electronic device may include a media server operative to receive media from the application and generate an image queue that includes video frames of the media. The render server may associate a slot ID with each image queue, while the media server may provide the slot ID to the application for inclusion in the layer tree. When the render server reaches a slot ID in the layer tree, the render server may identify and display the associated image queue.

16 Claims, 3 Drawing Sheets

MEDIA SYNCHRONIZATION VIA IMAGE QUEUE

CROSS-REFERENCE TO RELATED APPLICATION

This application claims the benefit of U.S. Provisional Patent Application No. 60/937,876, filed Jun. 28, 2007, which is incorporated by reference herein in its entirety.

BACKGROUND OF THE INVENTION

This invention relates to the processing of media objects and the synchronization of audio and video in an electronic device.

In some electronic devices, applications implemented on the electronic devices may control the display of content on a display. When a single or few applications that provide displays run simultaneously, the applications may easily coordinate amongst themselves, if necessary, to determine which application may be authorized to display of content or access media processing resources at a given time. For example, if a single application displaying content runs at one time, the application may decode media and provide the decoded video frames or graphics objects (e.g., open GL objects) to a render server for display.

As another example, if two applications run at the same time, each application generating content for display by the electronic device, the applications may coordinate amongst themselves so that only one application is decoding media and providing graphics objects for display to a render server at a given time. This approach may be used, for example, when a second application (e.g., a telephone application) interrupts an on-going first application (e.g., a media application). The first application may cease providing graphics for display to the render server to allow for the display of content provided by the second application. When the second application ends its interruption, the first application may resume providing graphics to the render server for display.

When the number of applications simultaneously running on the electronic device increases, however, it may be cumbersome and difficult to coordinate the operations of the applications amongst themselves. Accordingly, it may be desirable to provide a mechanism for controlling the processing of media provided for display on the electronic device. It may also be desirable to provide a mechanism that allows the user to perform playback operations with the media in a manner that limits the operations of the electronic device hardware.

SUMMARY OF THE INVENTION

A system by which an electronic device may coordinate the display requests of several applications implemented on an electronic device is provided. In particular, a system by which an electronic device can synch processed audio and video using an image queue is provided.

The electronic device may include a render server for controlling the display of graphics objects on the electronic device. The render server may include any suitable render server, including for example a Core Animation render server. To display a graphics object, and application may provide graphics display information to the render server for processing. For example, each application may provide a layer tree (e.g., in which each node of the layer tree includes a graphics object) to the render server. In some embodiments, one or more nodes of the layer tree may include media (e.g., a video).

To process media (e.g., from a layer tree node), the application may direct a media server to access the media file (e.g., using file I/O capabilities) and process the video and/or audio of the media file. The media server may process media using any suitable approach, including for example providing the media to hardware components operative to decode media (e.g., provide video to graphics circuitry for decoding the video). The media server may then provide the decoded media to the render server for display using any suitable data structure. For example, the media server may generate an image queue (IQ) in which a reference to each decoded video frame is stored. Each decoded video frame of the IQ may also include a time stamp (e.g., for synchronizing the video with audio).

To associate each IQ generated by the media server with the correct application, the render server may assign a slot ID to each IQ. Each application may refer, in its layer tree, to the slot ID instead of the IQ. When the render server processes the received layer tree, the render server may determine that the slot ID is not an IQ, identify the IQ associated with the slot ID (e.g., using a mapping table stored in the render server), and receive the proper IQ associated with the slot ID from the media server.

In some embodiments, time stamps associated with nodes of the layer tree or of the IQ may be defined in media time as opposed to host time, which may allow for more efficient manipulation of the IQ. For example, in response to a request from the application to pause a video, the media server may hold the IQ, and provide the same IQ to the render server in response to later instruction (e.g., resume the video) of the application. Because the IQ is in media time, pausing the media does not change the time stamps associated with the IQ (e.g., unlike host time). If instead host time were used for the IQ, the media server would have to re-decode the video to re-create a new IQ with new host time in response to a request to resume a video after pause.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Figure 1:
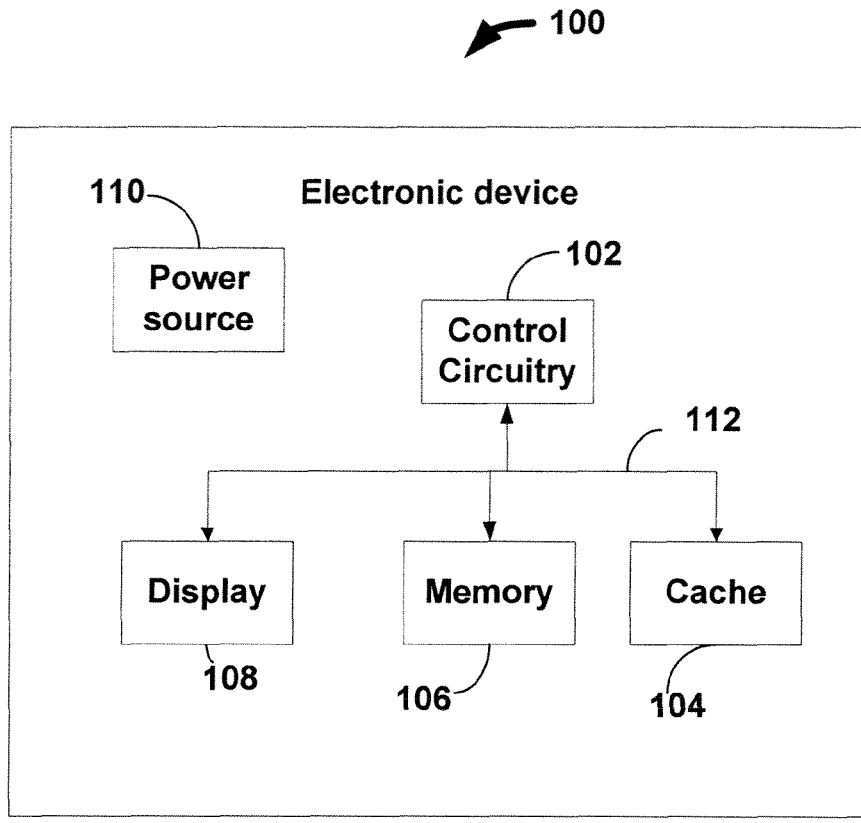
FIG. 1 is a simplified block diagram of an illustrative electronic device in accordance with one embodiment of the invention.

FIG. 1 is a simplified block diagram of an illustrative electronic device in accordance with one embodiment of the invention. Electronic device 100 may include control circuitry 102, cache 104, memory 106, display 108, power supply 110 and bus 112. In some embodiments, electronic device 100 may include more than one of each component, but for the sake of clarity, only one of each is shown in FIG. 1.

Control circuitry 102 may include any suitable component operative to control the operations and performance of electronic device 100. For example, control circuitry 102 may include a processor coupled to other components of electronic device 100 (e.g., via bus 112). Cache 104 may include one or more different types of memory which may be used for temporarily storing data for electronic device applications. Cache 104 may be stored on any suitable storage component including, for example, a hard-drive, flash memory, permanent memory such as ROM, semi-permanent memory such as RAM, or any other suitable type of storage component.

Memory 106 may include one or more storage mediums, including for example, a hard-drive, flash memory, permanent memory such as ROM, semi-permanent memory such as RAM, or cache. Memory 106 may store media (e.g., music and video files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps tracks of podcasts or television shows or other media a user subscribes to), contacts information (e.g., telephone numbers and email address), calendar information, and any other suitable data.

In some embodiments, memory 106 may store authentication information required for accessing one or more applications of the device. For example, memory 106 may store username and password combinations, or algorithms and keys for authenticating a string entered by the user (e.g., using a RSA algorithm). Memory 106 may store data for pairing itself or communicating with one or more devices using a short-range communications protocol. Display 108 may be any suitable display for providing electronic device outputs to the user. For example, display 108 may include a screen (e.g., a touch screen) incorporated in device 100. As another example, display 108 may include a mechanism by which a display may be projected for the user on a surface of device 100 or on a surface outside of device 100 (e.g., a projection system).

In some embodiments, device 100 may include a user interface operative to enable a user to interact with electronic device 100. The user interface can take a variety of forms such as, for example, a button, electronic device pad, dial, a click wheel, or a touch screen. In some embodiments, the user interface can be incorporated in display 108, for example as a multi-touch screen such as that described in U.S. Pat. No. 6,323,846, which is incorporated by reference herein in its entirety. The user interface may emulate a rotary phone or a multi-button electronic device pad, which may be implemented on a touch screen or the combination of a click wheel or other user input device and a screen. A more detailed discussion of such a rotary phone interface may be found, for example, in U.S. patent application Ser. No. 11/591,752, filed Nov. 1, 2006, entitled "Touch Pad with Symbols based on Mode," which is incorporated by reference herein in its entirety.

In some embodiments, the electronic device may include communications circuitry enabling device 100 to communicate with one or more other devices using any suitable communications protocol. For example, communications circuitry 108 may support Wi-Fi (e.g., a 802.11 protocol), Ethernet, Bluetooth (registered trademark), high frequency systems (e.g., 900 MHz, 2.4 GHz, and 5.6 GHz communication systems), infrared, TCP/IP (e.g., and the protocols used in each of the TCP/IP layers), HTTP, BitTorrent, FTP, RTP, RTSP, SSH, or any other communications protocol or combination of communications protocols.

The electronic device may be operative to display objects on display 108 using any suitable approach. In some embodiments, the electronic device may use Core Animation or another data visualization API to render displays. Operations of the data visualization API may be performed by any suitable processor or circuitry of the electronic device, including for example a central processing unit (e.g., a CPU), graphics processor (e.g., a GPU), or any other processor (e.g., control circuitry 102). Although the following discussion may describe the data visualization system as a Core Animation Render server (i.e., CAR server), it will be understood that any suitable render server or data visualization system may be used.

Bus 112 may provide a data transfer path for transferring data to, from, or between control circuitry 102, cache 104, memory 106 and communications circuitry 108. In some embodiments, a coder/decoder (CODEC) may be included to convert digital audio signals into an analog signal, which may be provided to an output port (not shown).

Power supply 110 may provide power to the components of device 100. For example, power supply 110 may be coupled to a power grid (e.g., a personal computer). As another example, power supply 110 may include one or more batteries for providing power in a portable device. As still another example, power supply 110 may be configured to generate power in a portable device from a natural source (e.g., solar power using solar cells).

Figure 2:
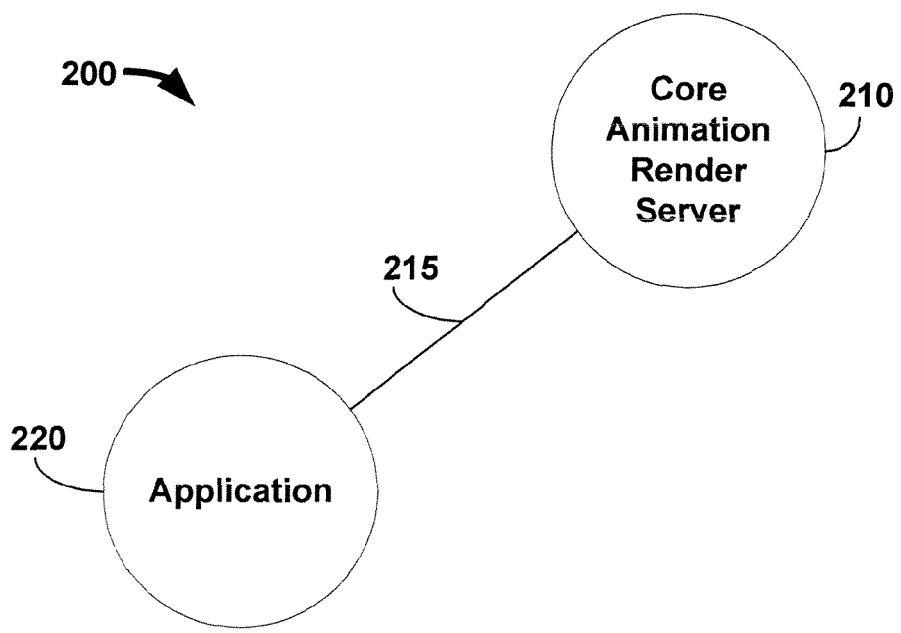
FIG. 2 is a schematic view of illustrative component arrangement for displaying objects on the display of an electronic device in accordance with one embodiment of the invention.

FIG. 2 is a schematic view of illustrative component arrangement for displaying objects on the display of an electronic device in accordance with one embodiment of the invention. Electronic device 200 may include Core Animation Render server 210 (CAR server 210) operative to control the display of layers in electronic device 200. Application 220 may be operative to call CAR server 210 over path 215 to direct CAR server 210 to display objects provided by or defined by application 220.

Figure 3:
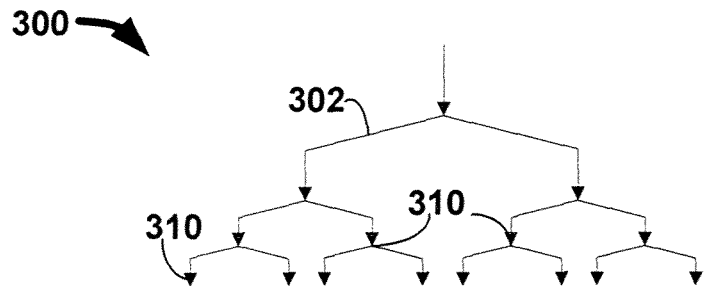
FIG. 3 is a schematic view of an illustrative tree structure transmitted to a render server for display on the display of an electronic device in accordance with one embodiment of the invention.

Application 220 may provide objects for display by CAR server 210 using any suitable approach. In some embodiments, application 220 may transmit objects for display using a tree structure. FIG. 3 is a schematic view of an illustrative tree structure transmitted to a render server for display on the display of an electronic device in accordance with one embodiment of the invention. Tree 300 may include a plurality of branches 302 and nodes 310. Each node 310 may include an image, text, a video, or any other object which may be displayed by CAR server 210 as part of a displayed layer (e.g., a play icon, a fast forward icon, a menu, or an image). In some embodiments, each node 310 may include a time stamp for identifying when to display the node 310. The time stamp may identify time using any suitable time basis including, for example, host time, media time, or any other time basis.

In some embodiments, application 220 may be operative to provide for the display of media or other graphics that need decoding (e.g., by graphics hardware). For example, application 220 may play back an encoded media file (e.g., a MOV or MPEG4 media file). As another example, application 220 may animate open GL objects (e.g., for providing three-dimensional animations). Application 220 may include file I/O capabilities for processing media files (e.g., video and audio decoding capabilities) prior to providing the media or graphics to the CAR server. For example, application 220 may direct the appropriate hardware to decode the video and audio of a selected media file, and subsequently transmit the decoded media to CAR server 210.

In some embodiments, several applications of the electronic device may simultaneously provide graphics for display by the electronic device. For example, the electronic device may simultaneously provide a media player (e.g., a music player), a data communication application (e.g., an e-mail application), a voice communication application (e.g., a telephone application), and an Internet application (e.g., a web browser). Each application may include a graphical interface for receiving inputs from the user, where each graphical interface may include one or more layers of graphics (e.g., menus, icons, images, video frames, and pointers). The electronic device may display the interfaces for each application in sequence (e.g., based on the application currently in use by the user), or at least portions of several interfaces may be simultaneously displayed.

When several applications of the electronic device all simultaneously and independently provide graphical interfaces to the CAR server for display, the CAR server may have difficulty determining which graphics to display, and when to display the graphics. In particular, all of the applications may need to coordinate to ensure that two applications do not simultaneously direct the CAR server or hardware components to perform contradictory or duplicative tasks (e.g., display a media application interface while the user requests a telephone interface). For example, all applications may need to be aware of each other's current status and requests to properly coordinate calls to the graphics hardware (e.g., calls to the GPU and graphics chip) and to the CAR server. As another example, applications may need to interrupt each other, and know which application to resume after an interruption (e.g., music playback, interrupted by a telephone ring, continues after the telephone communication ends). A more detailed description for coordinating applications may be found in concurrently filed U.S. patent application Ser. No. 11/841,716, filed Aug. 20, 2007, entitled "METHOD AND APPARATUS FOR MEDIATING AMONG MEDIA APPLICATIONS," which is incorporated by reference herein in its entirety.

Figure 4:
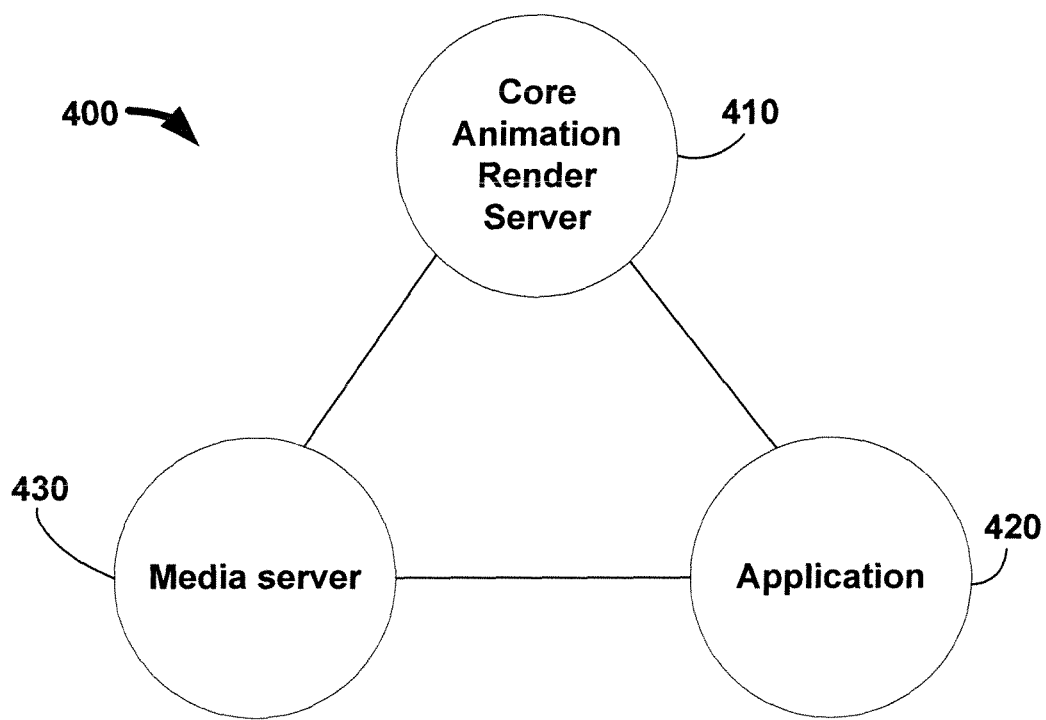
FIG. 4 is a schematic view of another illustrative component arrangement for displaying objects on the display of an electronic device in accordance with one embodiment of the invention.

Alternatively, to avoid requiring the applications to coordinate amongst themselves, the electronic device may include an additional component for processing and coordinating the video, audio, other graphics, or combinations of these provided by the applications for display. FIG. 4 is a schematic view of another illustrative component arrangement for displaying objects on the display of an electronic device in accordance with one embodiment of the invention. Similar to electronic device 200 (FIG. 2), electronic device 400 may include CAR server 410 and application 420. CAR server 410 and application 420 may include some or all of the features of CAR server 210 and application 220 (FIG. 2), respectively. In addition to CAR server 410 and application 420, electronic device 400 may include media server 430. Electronic device 400 may include several applications 420, each of which may be in communication with CAR server 410 and media server 430, described below. For the sake of clarity, however, only one application 420 is shown in FIG. 4.

Media server 430 may be operative to process video, audio, and/or other graphical objects on behalf of each application 420. By directing each application 420 to provide media to media server 430 for processing, electronic device 400 may centralize the management of device resources (e.g., graphics processing resources) and facilitate the coordination of application requests for displaying graphics. Although media server 430 may control, in combination with CAR server 410, the display of graphics, application 420 may retain playback transport control and may receive and process instructions provided by the user (e.g., through an input mechanism).

In response to receiving an instruction from application 420 to process a media file, media server 430 identify and select the file using the file I/O capabilities. Media server 430 may, using the necessary hardware in the electronic device (e.g., graphics circuitry and audio circuitry) decode the video and/or audio of the file and provided the decoded video to CAR server 410 using any suitable approach. In some embodiments, media server 430 may directly provide decoded media to CAR server 410. Alternatively, media server 430 may create an image queue (IQ) that includes some or all of the video frames of the decoded media. The IQ may include any suitable data structure for storing video frames. For example, the IQ may include a table with a video frame assigned to each line of the table. As another example, the IQ may include a table with a pointer to a video frame assigned to each line of the table.

Each video frame stored in the IQ may be assigned a time stamp for determining when to display each video frame (e.g., to determine the sequential display of video frames, or to synch video frames with audio). The time stamp may be set in host time (e.g., absolute time of the electronic device, for example tracked by the control circuitry), media time (e.g., time relative to other video frames of the media), or any other suitable time base. The time stamp of each video frame may be used, for example, to synch the audio decoded by media server 430 or application 420 (e.g., in the absence of media server 430) with the video frames stored in the IQ. When media time is associated with video frames in the IQ (e.g., instead of host time), the electronic device may pause, fast forward or rewind media stored in the IQ without modifying the IQ. For example, if the user changes the playback position of the media (e.g., pauses or fast-forwards the media), the time stamps remain valid even though host time (e.g., absolute time) continues to run. When the user subsequently provides a play instruction, CAR server 410 may continue to process and display the same IQ provided by the application or a media server. In contrast, if host time is used for the IQ, each video frame stored in the IQ may be associated with a time stamp related to absolute time (e.g., the video frame will be displayed when the time stamp matches the host time tracked by the control circuitry). If the user wishes to pause, fast forward or rewind the video stored in the IQ, the time stamps of the video frames in the IQ may become obsolete and incorrect (e.g., the time stamps correspond to normal play only). The application or media server may then need to flush the IQ, and re-decode each video frame to re-assign a new absolute host time that corresponds to the user's instruction for the video. This may cause unnecessary burdens on the electronic device resources (e.g., require significant processing and power).

In some embodiments, the IQ may include book-keeping information (e.g., book-keeping bits) for determining whether a video frame in an IQ has been displayed and is no longer needed. For example, each video frame may be associated with a book-keeping variable that is initially set by the component creating the IQ (e.g., application 420 or media server 430). When CAR server 410 receives the IQ, it may successively display the video frames of the IQ and change the book-keeping variable associated with each displayed video frame to indicate that the video frame has been consumed (e.g., change a book-keeping bit from 0 to 1).

The electronic device may release memory used by an IQ using any suitable approach. For example, the control circuitry may be operative to poll the memory where one or more IQs are stored to detect memory blocks used by video frames for which a book-keeping variable indicates that the video frames have been consumed. The control circuitry may poll the memory at any suitable time, including for example at regular intervals (e.g., in host time or based on the applications in use), in response to detecting that the CAR server has displayed processed media (e.g., from communication received from the CAR server), in response to an instruction from the application, or at any other suitable time. The control circuitry may be operative to indicate to an application, media server, or other component of the electronic device that memory has been released and can be reused for a new IQ or other purpose.

As discussed above, several components may need access to at least a portion of each IQ. For example, an application or media server may generate or create the IQ. The CAR server may read and display the IQ, and change book-keeping variables associated with each video frame of the IQ. The control circuitry or another component of the electronic device may be operative to release memory used by consumed IQs or consumed video frames of an IQ. The electronic device may store an IQ in any suitable memory to allow each component access. For example, an IQ may be stored in memory that is shared by at least the components that perform operations on or with the IQ. As another example, the different parts of the IQ may be stored in different parts of memory (e.g., the video frames may be stored in a part of memory that is write-accessible to the application and read-accessible to the CAR server, and the book-keeping variable may be stored in a part of memory that is write-accessible to the application and the CAR server). To ensure that different components do not simultaneously seek to access or edit an IQ, application 220, CAR server 210, the media server and the control circuitry may be subject to rules governing the use of the IQ or the memory in which the IQ is.

Each application 420 may provide graphics for display to CAR server 410 using any suitable approach. In some embodiments, each application may provide graphics to CAR server 410 using a layer tree (e.g., layer tree 300, FIG. 3). The layer tree may include graphics that do not need processing (e.g., user interface graphics) and processed media (e.g., media processed by media server 430). CAR server 410 may process each node 310 of layer tree 300 as it is received to display the graphics objects provided by application 420. For example, CAR server 410 may proceed along layer tree 300 to display, as successive layers, the different graphics information. CAR server 410 may change or modify the displayed objects based on the time stamps in layer tree 300, for example to display animated content or to change the appearance of a graphics object (e.g., an icon) based on an instruction from application 420 (e.g., in response to a user input).

The layer tree may store processed media using any suitable approach. For example, if the application 420 creating the layer tree has sufficient identifying information (e.g., addresses in memory for the processed media or IQ), the application 420 may store the IQ in a node (e.g., media server 430 may provide application 420 with identifying information for the IQ such that application 420 may in turn provide the IQ, using the IQ identifying information, as a node 310 in layer tree 300).

In some embodiments, application 420 may instead not have sufficient identifying information for the IQ. For example, when application 420 does not process the media and create the IQ, the IQ identifying or referencing information may not be available to application 420.

Instead, upon processing media, media server 430 may request a slot ID from CAR server 410 for the newly created IQ. In response to receiving the request, CAR server 410 may define and provide a slot ID to media server 430, and associate the defined slot ID with the particular IQ. For example, CAR server 410 may associate a slot ID with an IQ identifier provided by media server 430 using one or more image queue mapping tables (e.g., hash tables). The slot ID may have any suitable form, including for example a unique number or character string (e.g., sequentially or randomly generated strings), or may be related to a time stamp or other process identifier. Car server 410 or media server 430 may provide the received slot ID to application 420 for inclusion in the application layer tree (e.g., as a node).

As CAR server 410 receives a layer tree from application 420 for display, CAR server 410 may process each node of the layer tree to identify which graphics to display, and how to display each graphic. When CAR server reaches a node that includes a slot ID (e.g., instead of a graphic or an IQ), CAR server 410 may refer to an appropriate image queue mapping table to identify the IQ associated with the slot ID. CAR server 430 may then retrieve the identified IQ from memory for display by the electronic device.

Figure 5:
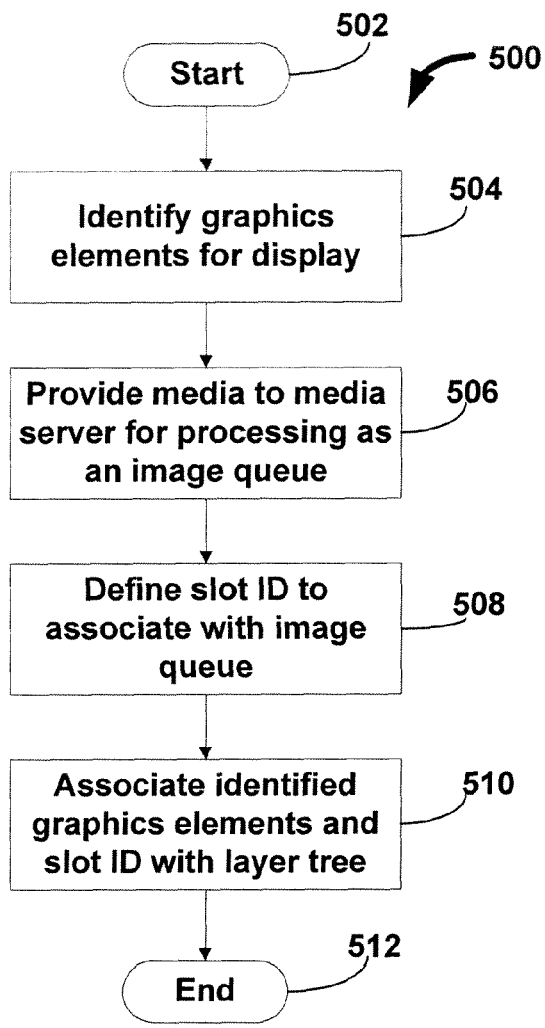
FIG. 5 is a flowchart of an illustrative process for associating graphics of an application with a layer tree in accordance with one embodiment of the invention.

FIG. 5 is a flowchart of an illustrative process for associating graphics of an application with a layer tree in accordance with one embodiment of the invention. Process 500 may begin at step 502. At step 504, an application may identify graphics for display by the electronic device. For example, the application may identify the graphics forming the user interface of the application, or media to be displayed by the application. At step 506, the application may provide identified media to a media server for processing as an image queue (IQ). For example, the media server may receive a media file from the application and extract each video frame of the media file. The media server may then associate each video frame with entries of an IQ data structure (e.g., a table).

At step 508, a render server provides a slot ID for the IQ created by the media server. For example, the media server may provide a request to the render server for a slot ID associated with the IQ. The render server may associate the slot ID and IQ using any suitable approach, including for example using an image queue mapping table (e.g., a hash). The render server may also provide the slot ID to the application for referring to the IQ. At step 510, the application may define a layer tree that includes the identified graphics and defined slot IDs. For example, the application may define a layer tree structure in which different layers of graphics are organized as nodes in the layer tree. The application may then provide the layer tree to the render server at an appropriate time for display by the electronic device. Process 500 may then end at step 512.

Figure 6:
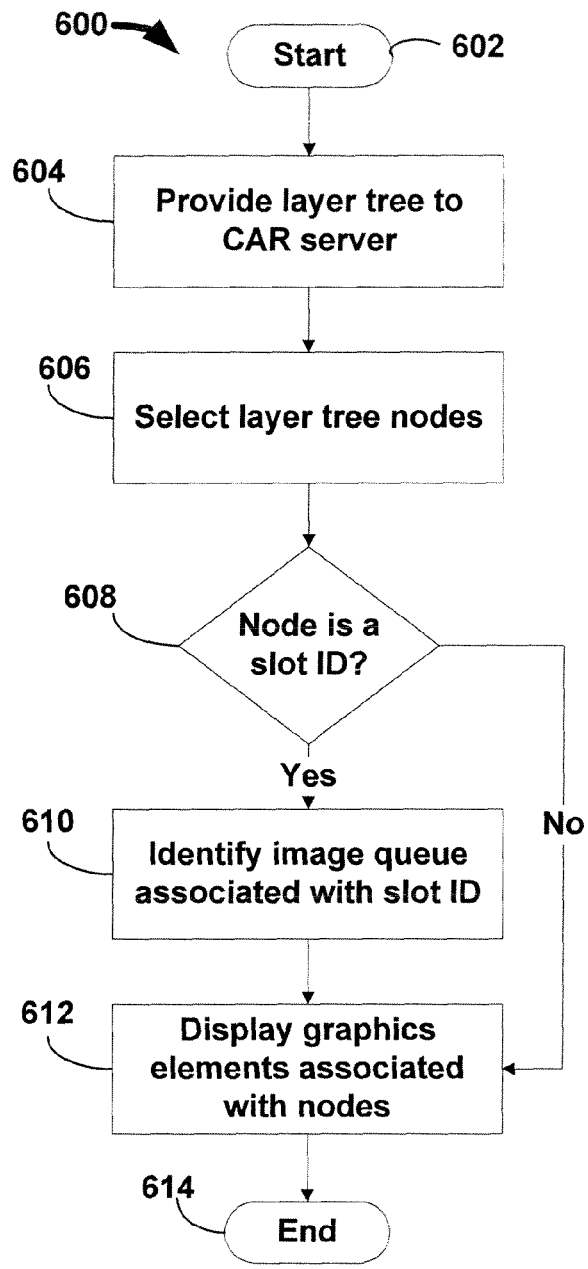
FIG. 6 is a flowchart of an illustrative process for displaying graphics using a render server in accordance with one embodiment of the invention.

FIG. 6 is a flowchart of an illustrative process for displaying graphics using a render server in accordance with one embodiment of the invention. Process 600 may begin at step 602. At step 604, the application may provide the layer tree to the render server. For example, the application may provide a layer tree defined using process 500 (FIG. 5) to the render server. At step 606, the render server may select layer tree nodes. For example, the render server may traverse the received layer tree to identify different graphics elements for display by the electronic device. As the render server traverses the layer tree, the render server may detect the graphics elements placed in each node to layer the graphics element on the display.

At step 608, the render server may determine whether a selected node is a slot ID. For example, the render server may determine whether a selected node includes metadata information or is provided in a form associated with a slot ID (e.g., a particular type of data string, or a string having a particular length, header or other characteristic). If the render server determines that the node is a slot ID, process 600 may move to step 610. At step 610, the electronic may identify the image queue (IQ) associated with the identified slot ID. For example, the render server may refer to an image queue mapping table that includes associations of slot IDs and IQs and identify, from the table, the IQ associated with the detected slot ID. Process 600 may then move to step 612.

If, at step 608, the render server instead determines that the node is not a slot ID, process 600 may move to step 612. At step 612, the render server may control the display of the graphics elements associated with the selected layer tree nodes. For example, the render server may direct the electronic device to display, in successive layers as defined in the layer tree, the graphics elements of each node. The render server may retrieve the IQ associated with each identified slot ID to display processed media (e.g., processed by the media server) in the display.

The above described embodiments of the present invention are presented for purposes of illustration and not of limitation, and the present invention is limited only by the following claims.

What is claimed is:

1. A method for processing graphics elements provided by an application for display, comprising:
   identifying, by the application, a plurality of graphics elements to construct a graphical interface for receiving inputs from a user, the plurality of elements comprising a media item;
   directing, by the application, the media item to a media server to create an image queue, wherein the image queue comprises a data structure to store elements of the media item;
   receiving, by the application, a memory address for the image queue from the media server;
   defining, by the application, a layer tree comprising a plurality of nodes, each node specifying one of the identified plurality of graphics elements, wherein the node that specifies the media item comprises the memory address for the image queue; and
   providing, by the application, the defined layer tree to a render server to display the graphical interface.

2. The method of claim 1, wherein the elements of the media item comprise video frames of the media item and wherein the video frames are associated with time stamps.

3. The method of claim 2, wherein the time stamps are in media time.

4. The method of claim 2, further comprising:
   directing the render server to sequentially display the plurality of video frames in an order defined by the time stamps.

5. A method for displaying graphics content provided by an application, comprising:
   generating, in response to a request from a media server, a slot ID for an image queue created by the media server;
   associating the slot ID with a memory address for the image queue, wherein the image queue comprises a data structure that stores elements of a media item;
   receiving a layer tree comprising a plurality of nodes from an application, each node specifying a graphics element that forms a portion of a graphical interface for receiving user inputs to the application;
   processing each node of the layer tree;
   determining whether a processed node comprises a graphics element or the slot ID;
   retrieving the image queue from a memory using the memory address associated with the slot ID in response to determining that a processed node includes the slot ID; and
   displaying the graphics elements of the layer tree, wherein the graphics elements comprise the media item.

6. The method of claim 5, further comprising:
   displaying the graphics elements in layers based on the respective position of each graphics element in the layer tree.

7. The method of claim 5, wherein the act of processing each node of the layer tree comprises traversing the layer tree to select each graphics element.

8. The method of claim 5, wherein the graphics elements are stored as nodes in the layer tree.

9. A system for displaying graphics content provided by an application, comprising an application, a media server and a render server,
   the application operative to:
      identify a plurality of graphics items to construct a graphical interface for receiving inputs from a user, at least one of the graphics items comprising media requiring processing; and
      provide the media to the media server;
   the media server operative to:
      process the media to create an image queue, wherein the image queue comprises a data structure to store elements of the media;
      request a slot ID from the render server to associate with a memory address for the image queue; and
      provide the slot ID to the application;
   the application further operative to:
      generate a layer tree comprising the identified graphics items and the provided slot ID; and
      provide the layer tree to the render server to display the graphical interface.

10. The system of claim 9, wherein the render server is operative to:
   process the layer tree provided by the application; and
   display the graphics items of the layer tree.

11. The system of claim 10, wherein the render server is further operative to:
   determine that the layer tree includes the slot ID;
   identify the image queue associated with the slot ID; and
   locate the image queue in a memory using the associated memory address for display.

12. The system of claim 9, wherein the render server is operative to:
   receive a request for the slot ID for the image queue from the media server;
   define the slot ID; and
   associate the defined slot ID with the image queue in an image queue mapping table.

13. The system of claim 9, wherein the application is further operative to store the identified graphics items as nodes in the layer tree.

14. The system of claim 9, wherein the media server is further operative to provide the memory address for the image queue to the render server.

15. The system of claim 9, wherein the media server is further operative to:
   extract a plurality of video frames of the media; and
   associate a time stamp with each of the plurality of extracted video frames.

16. The system of claim 15, wherein the time stamps are in application time.

* * * * *

UNITED STATES PATENT AND TRADEMARK OFFICE
CERTIFICATE OF CORRECTION

PATENT NO. : 8,531,469 B2  
APPLICATION NO. : 12/146318  
DATED : September 10, 2013  
INVENTOR(S) : Harper et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 869 days.

Signed and Sealed this
Twenty-seventh Day of January, 2015

Michelle K. Lee
*Deputy Director of the United States Patent and Trademark Office*